(12) United States Patent
Thorstensen-Woll et al.

(10) Patent No.: US 9,278,793 B2
(45) Date of Patent: Mar. 8, 2016

(54) SEALING MEMBER WITH REMOVABLE PORTION FOR EXPOSING AND FORMING A DISPENSING FEATURE

(71) Applicant: Selig Sealing Products, Inc., Forrest, IL (US)

(72) Inventors: Robert William Thorstensen-Woll, Barrie (CA); Steven A. Brucker, Gibson City, IL (US)

(73) Assignee: SELIG SEALING PRODUCTS, INC., Forrest, IL (US)

( * ) Notice: Subject to any disclaimer, the term of this patent is extended or adjusted under 35 U.S.C. 154(b) by 0 days.

(21) Appl. No.: 14/298,378

(22) Filed: Jun. 6, 2014

(65) Prior Publication Data

US 2014/0284331 A1    Sep. 25, 2014

Related U.S. Application Data

(63) Continuation of application No. 13/529,504, filed on Jun. 21, 2012, now Pat. No. 8,746,484.

(60) Provisional application No. 61/501,075, filed on Jun. 24, 2011.

(51) Int. Cl.
*B65D 17/34* (2006.01)
*B65D 39/00* (2006.01)
(Continued)

(52) U.S. Cl.
CPC ................ *B65D 77/206* (2013.01); *B32B 1/02* (2013.01); *B32B 3/04* (2013.01); *B32B 3/16* (2013.01);
(Continued)

(58) Field of Classification Search
CPC ...... B29C 70/78; B29C 70/80; B65D 41/045; B65D 53/04; B65D 51/18; B65D 51/185; B65D 51/20; B65D 51/22; B65D 5/72; B65D 5/74; B65D 5/746; B65D 2101/0023; A47K 10/42; A47K 10/421

USPC ............... 215/232, 250, 341, 347; 220/256.1, 220/258.1, 258.2, 259.1, 259.2, 259.3, 220/259.4, 260, 265, 266, 270; 426/112, 426/115; 428/221, 343, 346, 347, 349
See application file for complete search history.

(56) References Cited

U.S. PATENT DOCUMENTS 2,768,762 A   10/1956   Guinet
3,235,165 A   2/1966   Jackson
(Continued)

FOREIGN PATENT DOCUMENTS

AT   501393 A1   8/2006
AT   11738 U1   4/2011
(Continued)

OTHER PUBLICATIONS

Kobusch-Sengewald, ALKOvent and ALKOflex perforated product description, 1 page, available at least as of Mar. 2011.
(Continued)

*Primary Examiner* — Steven A. Reynolds
*Assistant Examiner* — Javier A Pagan
(74) *Attorney, Agent, or Firm* — Fitch, Even, Tabin & Flannery LLP

(57) ABSTRACT

A sealing member or inner seal for a sealing to a rim of a container is described herein that is capable of initially providing sealing for the container and subsequently for providing a dispenser or dispensing feature having a cleanly formed opening or other passage therethrough for dispensing container contents. The sealing members or inner seals herein are constructed from flexible sheets or laminates defining one or more integrated or preformed dispensing feature(s) or element(s) for dispensing contents from the container. The one or more integrated dispensing feature(s) or element(s) are initially covered on both sides to be exposed for use upon removal of a portion of the sealing member.

7 Claims, 3 Drawing Sheets

(51) Int. Cl.

| | | |
|---|---|---|
| B65D 77/20 | (2006.01) | |
| B32B 7/06 | (2006.01) | |
| B32B 27/06 | (2006.01) | |
| B65D 17/50 | (2006.01) | |
| B32B 7/10 | (2006.01) | |
| B32B 7/12 | (2006.01) | |
| B32B 15/04 | (2006.01) | |
| B32B 15/08 | (2006.01) | |
| B32B 27/08 | (2006.01) | |
| B32B 27/16 | (2006.01) | |
| B32B 27/30 | (2006.01) | |
| B32B 27/32 | (2006.01) | |
| B32B 27/36 | (2006.01) | |
| B32B 1/02 | (2006.01) | |
| B32B 3/04 | (2006.01) | |
| B32B 3/16 | (2006.01) | |
| B32B 3/20 | (2006.01) | |
| B32B 3/26 | (2006.01) | |
| B32B 3/30 | (2006.01) | |

(52) U.S. Cl.
CPC . *B32B 3/20* (2013.01); *B32B 3/266* (2013.01); *B32B 3/30* (2013.01); *B32B 7/06* (2013.01); *B32B 7/10* (2013.01); *B32B 7/12* (2013.01); *B32B 15/046* (2013.01); *B32B 15/08* (2013.01); *B32B 27/065* (2013.01); *B32B 27/08* (2013.01); *B32B 27/16* (2013.01); *B32B 27/306* (2013.01); *B32B 27/308* (2013.01); *B32B 27/32* (2013.01); *B32B 27/36* (2013.01); *B65D 17/501* (2013.01); *B32B 2266/025* (2013.01); *B32B 2266/0264* (2013.01); *B32B 2439/40* (2013.01)

(56) References Cited

U.S. PATENT DOCUMENTS

| | | |
|---|---|---|
| 3,292,828 A | 12/1966 | Stuart |
| 3,302,818 A | 2/1967 | Balocca et al. |
| 3,460,310 A | 8/1969 | Adcock et al. |
| 3,990,603 A | 11/1976 | Brochman |
| 4,133,796 A | 1/1979 | Bullman |
| 4,206,165 A | 6/1980 | Dukess |
| 4,582,735 A | 4/1986 | Smith |
| 4,588,099 A | 5/1986 | Diez |
| 4,596,338 A | 6/1986 | Yousif |
| 4,636,273 A | 1/1987 | Wolfersperger |
| 4,666,052 A | 5/1987 | Ou-Yang |
| 4,735,335 A | 4/1988 | Torterotot |
| 4,741,791 A | 5/1988 | Howard |
| 4,770,325 A | 9/1988 | Gordon |
| 4,801,647 A | 1/1989 | Wolfe, Jr. |
| 4,811,856 A | 3/1989 | Fischman |
| 4,837,061 A | 6/1989 | Smits |
| 4,960,216 A | 10/1990 | Giles |
| 4,961,986 A | 10/1990 | Galda |
| 5,004,111 A | 4/1991 | McCarthy |
| 5,015,318 A | 5/1991 | Smits |
| 5,055,150 A | 10/1991 | Rosenfeld |
| 5,057,365 A | 10/1991 | Finkelstein |
| 5,071,710 A | 12/1991 | Smits |
| 5,098,495 A | 3/1992 | Smits |
| RE33,893 E | 4/1992 | Elias |
| 5,125,529 A | 6/1992 | Torterotot |
| 5,149,386 A | 9/1992 | Smits |
| 5,178,967 A | 1/1993 | Rosenfeld |
| 5,197,618 A | 3/1993 | Goth |
| 5,265,745 A | 11/1993 | Pereyra |
| 5,433,992 A | 7/1995 | Galda |
| 5,513,781 A | 5/1996 | Ullrich |
| 5,514,442 A | 5/1996 | Galda |
| 5,598,940 A | 2/1997 | Finkelstein |
| 5,601,200 A | 2/1997 | Finkelstein |
| 5,615,789 A | 4/1997 | Finkelstein |
| 5,669,521 A | 9/1997 | Wiening |
| 5,702,015 A | 12/1997 | Giles |
| 5,860,544 A | 1/1999 | Brucker |
| 5,871,112 A | 2/1999 | Giles |
| 5,915,577 A | 6/1999 | Levine |
| 5,975,304 A | 11/1999 | Cain |
| 6,056,141 A | 5/2000 | Navarini et al. |
| 6,082,566 A | 7/2000 | Yousif |
| 6,096,358 A | 8/2000 | Murdick |
| 6,131,754 A | 10/2000 | Smelko |
| 6,139,931 A | 10/2000 | Finkelstein |
| 6,158,632 A | 12/2000 | Ekkert |
| 6,194,042 B1 | 2/2001 | Finkelstein |
| 6,312,776 B1 | 11/2001 | Finkelstein |
| 6,378,715 B1 | 4/2002 | Finkelstein |
| 6,458,302 B1 | 10/2002 | Shifflet |
| 6,548,302 B1 | 4/2003 | Mao |
| 6,602,309 B2 | 8/2003 | Vizulis |
| 6,627,273 B2 | 9/2003 | Wolf |
| 6,699,566 B2 | 3/2004 | Zeiter |
| 6,705,467 B1 | 3/2004 | Kancsar |
| 6,722,272 B2 | 4/2004 | Jud |
| 6,767,425 B2 | 7/2004 | Meier |
| 6,790,508 B2 * | 9/2004 | Razeti ........................ 428/138 |
| 6,866,926 B1 | 3/2005 | Smelko |
| 6,902,075 B2 | 6/2005 | OBrien |
| 6,916,516 B1 | 7/2005 | Gerber |
| 6,955,736 B2 | 10/2005 | Rosenberger |
| 6,974,045 B1 | 12/2005 | Trombach |
| 7,128,210 B2 | 10/2006 | Razeti |
| 7,182,475 B2 | 2/2007 | Kramer |
| 7,217,454 B2 | 5/2007 | Smelko |
| RE39,790 E | 8/2007 | Fuchs |
| 7,316,760 B2 | 1/2008 | Nageli |
| 7,448,153 B2 | 11/2008 | Maliner |
| 7,531,228 B2 | 5/2009 | Perre |
| 7,648,764 B2 | 1/2010 | Yousif |
| 7,713,605 B2 | 5/2010 | Yousif |
| 7,740,730 B2 | 6/2010 | Schedl |
| 7,740,927 B2 | 6/2010 | Yousif |
| 7,789,262 B2 | 9/2010 | Niederer |
| 7,798,359 B1 | 9/2010 | Marsella |
| 7,819,266 B2 | 10/2010 | Ross |
| 7,838,109 B2 | 11/2010 | Declerck |
| 7,850,033 B2 | 12/2010 | Thorstensen-Woll |
| 8,057,896 B2 | 11/2011 | Smelko |
| 8,329,288 B2 | 12/2012 | Allegaert |
| 8,348,082 B2 | 1/2013 | Cain |
| 2002/0068140 A1 | 6/2002 | Finkelstein |
| 2003/0168423 A1 | 9/2003 | Williams |
| 2004/0043238 A1 | 3/2004 | Wuest |
| 2004/0109963 A1 | 6/2004 | Zaggia |
| 2005/0048307 A1 | 3/2005 | Schubert |
| 2005/0208242 A1 | 9/2005 | Smelko |
| 2006/0000545 A1 | 1/2006 | Nageli |
| 2006/0003120 A1 | 1/2006 | Nageli |
| 2006/0003122 A1 | 1/2006 | Nageli |
| 2006/0151415 A1 | 7/2006 | Smelko |
| 2006/0278665 A1 | 12/2006 | Bennett |
| 2007/0003725 A1 | 1/2007 | Yousif |
| 2007/0065609 A1 | 3/2007 | Korson |
| 2007/0267304 A1 | 11/2007 | Portier |
| 2007/0298273 A1 | 12/2007 | Thies |
| 2008/0026171 A1 | 1/2008 | Gullick |
| 2008/0073308 A1 | 3/2008 | Yousif |
| 2008/0103262 A1 | 5/2008 | Haschke |
| 2008/0156443 A1 | 7/2008 | Schaefer |
| 2008/0169286 A1 | 7/2008 | McLean |
| 2008/0231922 A1 | 9/2008 | Thorstensen-Woll |
| 2008/0233339 A1 | 9/2008 | Thorstensen-Woll |
| 2008/0233424 A1 | 9/2008 | Thorstensen-Woll |
| 2009/0078671 A1 | 3/2009 | Triquet |
| 2009/0208729 A1 | 8/2009 | Allegaert |
| 2009/0304964 A1 | 12/2009 | Sachs |
| 2010/0009162 A1 | 1/2010 | Rothweiler |
| 2010/0030180 A1 | 2/2010 | Deckerck |
| 2010/0047552 A1 | 2/2010 | McLean |

(56) References Cited

U.S. PATENT DOCUMENTS

| | | |
|---|---|---|
| 2010/0059942 A1 | 3/2010 | Rothweiler |
| 2010/0116410 A1 | 5/2010 | Yousif |
| 2010/0155288 A1 | 6/2010 | Harper |
| 2010/0170820 A1 | 7/2010 | Leplatois |
| 2010/0193463 A1* | 8/2010 | O'Brien et al. ............... 215/232 |
| 2010/0213193 A1 | 8/2010 | Helmlinger |
| 2010/0221483 A1 | 9/2010 | GonzalezCarro |
| 2010/0290663 A1 | 11/2010 | Trassl |
| 2010/0314278 A1 | 12/2010 | Fonteyne |
| 2011/0000917 A1 | 1/2011 | Wolters |
| 2011/0005961 A1 | 1/2011 | Leplatois |
| 2011/0089177 A1 | 4/2011 | Thorstensen-Woll |
| 2011/0091715 A1 | 4/2011 | Rakutt |
| 2011/0100949 A1 | 5/2011 | Grayer |
| 2011/0100989 A1 | 5/2011 | Cain |
| 2011/0138742 A1 | 6/2011 | McLean |
| 2011/0147353 A1 | 6/2011 | Kornfeld |
| 2012/0000910 A1 | 1/2012 | Ekkert |
| 2012/0043330 A1 | 2/2012 | McLean |
| 2012/0067896 A1 | 3/2012 | Daffner |
| 2012/0103988 A1 | 5/2012 | Wiening |
| 2012/0111758 A1 | 5/2012 | Lo |
| 2012/0241449 A1 | 9/2012 | Frischmann |
| 2013/0020324 A1 | 1/2013 | Thorstensen-Woll |
| 2014/0061196 A1 | 3/2014 | Thorstensen-Woll |
| 2014/0186589 A1 | 7/2014 | Chang |

FOREIGN PATENT DOCUMENTS

| | | |
|---|---|---|
| BR | 8200231 U | 9/2003 |
| BR | 0300992 A | 11/2004 |
| CA | 2015992 A1 | 1/1991 |
| DE | 102006030118 B3 | 5/2007 |
| DE | 10204281 A1 | 8/2007 |
| DE | 102007022935 B4 | 4/2009 |
| DE | 202009000245 U1 | 4/2009 |
| EP | 0668221 A1 | 8/1995 |
| EP | 0826598 A2 | 3/1998 |
| EP | 0826599 A2 | 3/1998 |
| EP | 0717710 B1 | 4/1999 |
| EP | 0915026 A1 | 5/1999 |
| EP | 0706473 B1 | 8/1999 |
| EP | 1075921 | 2/2001 |
| EP | 1199253 | 4/2002 |
| EP | 0803445 B1 | 11/2003 |
| EP | 1462381 A1 | 9/2004 |
| EP | 1577226 A1 | 9/2005 |
| EP | 1814744 A1 | 8/2007 |
| EP | 1834893 A1 | 9/2007 |
| EP | 1837288 A1 | 9/2007 |
| EP | 1839898 A1 | 10/2007 |
| EP | 1839899 A1 | 10/2007 |
| EP | 1857275 A1 | 11/2007 |
| EP | 1873078 A1 | 1/2008 |
| EP | 1445209 B1 | 5/2008 |
| EP | 1918094 A1 | 5/2008 |
| EP | 1968020 A1 | 9/2008 |
| EP | 1992476 A1 | 11/2008 |
| EP | 2230190 A1 | 9/2010 |
| EP | 2292524 A1 | 3/2011 |
| FR | 2916157 A1 | 11/2008 |
| FR | 2943322 A1 | 9/2010 |
| KR | 100711073 B1 | 4/2007 |
| KR | 100840926 B1 | 6/2008 |
| KR | 100886955 B1 | 3/2009 |
| MX | 05002905 A | 2/2006 |
| MX | 2010001867 A | 4/2010 |
| WO | 9905041 A1 | 2/1999 |
| WO | 0066450 | 11/2000 |
| WO | 2006018556 A1 | 2/2006 |
| WO | 2006021291 A1 | 3/2006 |
| WO | 2006073777 A1 | 7/2006 |
| WO | 2006108853 A1 | 10/2006 |
| WO | 2008027029 A2 | 3/2008 |
| WO | 2008027036 A1 | 3/2008 |
| WO | 2008039350 A2 | 4/2008 |
| WO | 2008125784 A1 | 10/2008 |
| WO | 2008125785 A1 | 10/2008 |
| WO | 2008148176 A1 | 12/2008 |
| WO | 2009092066 A2 | 7/2009 |
| WO | 2010115811 A1 | 10/2010 |
| WO | 2011039067 A1 | 4/2011 |
| WO | 2012079971 A1 | 6/2012 |
| WO | 2012113530 A1 | 8/2012 |
| WO | 2012152622 A1 | 11/2012 |
| WO | 2012172029 A1 | 12/2012 |

OTHER PUBLICATIONS

Dispensing inner seal, ALKOflex Pert, Packaging Digest, Oct. 2011, p. 20.

Dispense Lid, [online], [retrieved on Jun. 15, 2012]. Retrieved from the Internet: <URL: http://www.constantia-hueck.com/Dispense-Lid.1459.0.html?&L=0&MP=1199-1275>, 2 pages, available at least as of May 2012.

PCT International Search Report and Written Opinion of the International Searching Authority dated Sep. 21, 2012 for International Application PCT/US2012/043568, 14 pages.

Induction seal liner, dated Jan. 31, 2004, [online], [retrieved on Oct. 2, 2012]. Retrieved from the Internet: <URL: http://www.packworld.com/package-component/closures/induction-seal-liner>, 7 pages.

* cited by examiner

SEALING MEMBER WITH REMOVABLE PORTION FOR EXPOSING AND FORMING A DISPENSING FEATURE

CROSS REFERENCE TO RELATED APPLICATIONS

This application is a continuation of prior application Ser. No. 13/529,504, filed Jun. 21, 2012, which claims benefit of U.S. Provisional Application No. 61/501,075, filed Jun. 24, 2011, both of which are hereby incorporated herein by reference in their entirety.

FIELD

The disclosure relates to a sealing member for the mouth of a container, and more particularly, to a removable pull-tab sealing member and a liner defining a dispensing apparatus thereon.

BACKGROUND

Many containers are provided with a finish or fitment having perforations or a pour spout for dispensing contents from the container. Spice containers and salad dressing bottles are some examples that include such features. Other types of containers, bottles, and packages may also include similar covers, finishes, or fitments.

A spice container, for example, often includes a molded snap-on cover or fitment that extends across an opening or mouth of the container. The cover or fitment is a relatively rigid plastic piece that is molded into a desired shape. It fits over the container's mouth and resides underneath a screw cap. This molded snap-on cover or fitment often includes several holes or perforations for dispensing a spice, powder, food ingredient, or other granulated product in the container. These containers often include a seal liner underneath the perforated cover or fitment in order to maintain the freshness of the product held in the container prior to use by a consumer. In order to dispense the contents, a consumer first must remove the rigid, molded cover or fitment in order to gain access to the seal liner. Once the cover or fitment is removed, the seal liner can be peeled from the container. Then, the molded perforated cover or fitment must be replaced on the container prior to dispensing its product.

Similarly, salad dressing bottles can have a rigid, molded cap and/or fitment that define a pour spout for ease in pouring a liquid product out of the bottle. Like the spice container, the salad dressing bottle may also include a seal liner underneath the cap or fitment. In use, the cap and fitment must first be removed by the consumer in order to remove the seal liner prior to its first use. Then, to use the bottle as intended, the cap and fitment are replaced on the bottle.

These assemblies suffer several shortcomings. As the container or bottle is supplied to the consumer with the seal liner underneath the molded fitments, in order to use the container as intended, the consumer must first remove the molded fitment in order to gain access to the seal liner. In many cases this is undesirable due to the extra steps required by the consumer to first, remove the cap; second, to remove the fitment; third, to remove the seal liner; fourth, to replace the fitment; and fifth, to replace the cap. As the fitments are generally rigid molded plastic, they may be difficult to remove and then replace tightly back on the container. Oftentimes, they may crack or deform upon removal. In addition, these assemblies require additional manufacturing steps to mold and assemble the container with the additional pieces.

Other containers may have a two-component seal or liner having an upper, peelable portion that exposes an opening in a lower liner portion upon removal of the upper, peelable portion. The lower liner portion includes the opening extending all the way through. The opening is covered by the upper, peelable portion that is glued or otherwise held to the lower liner portion with adhesive. In this approach, however, the ability of the two-component liner to form a good seal to maintain product freshness prior to a consumer peeling off the upper, peelable portion is limited by the nature of the glue or adhesive holding the upper portion to the lower liner portion. Because the opening in these prior seals extends all the way through the lower liner portion, the adhesive or glue holding the upper, peelable portion to the lower liner portion could allow penetration of air, moisture, oxygen, and the like into the container depending on the nature and characteristics of the adhesive or glue.

Other containers may have an opening defined in a rigid upper wall, such as a pour opening defined in an aluminum upper wall of an aluminum beverage or juice container. Some prior approaches may also include two flexible liners covering the opening. One flexible liner is adhered to the inside aluminum upper wall and covering one side of the opening, and the other flexible liner is adhered to the outside aluminum upper wall and covering the other side of the opening. The two liners are adhered to each other through the opening. During use, a consumer removes the outer liner, which pulls the inner liner through the opening. This action tears the inner liner on the sharp edges defining the opening in the aluminum wall. In this prior approach, it is relatively easy to pull and tear the inside liner due to the rigid nature of the top aluminum wall and the sharp cutting edges that the aluminum forms about the opening.

Rather than using a rigid upper wall to define an opening, some other prior approaches may utilize flexible inner seal type structures that define an opening in a flexible layer forming the inner seal. The inner seal may include a peelable, upper layer covering one side of the inner seal opening, and a lower layer covering the other side of the opening. The peelable, upper layer and the lower layer may be adhered to each other through the inner seal opening. Similar to the removal action with regards to the aluminum can or container noted above, a consumer can peel off the peelable, upper layer to pull the lower layer through the opening defined in the flexible inner seal. This action tears the lower layer to expose the opening for use. In this approach, however, when the opening is defined in a flexible inner seal (rather than the rigid layer of the cans discussed above), the tearing of the lower layer often forms an unappealing opening due to frayed or ragged edges in the lower layer because the flexible nature of the inner seal. The flexible layers used to form the inner seal and define the opening therein do not offer sufficient rigidity to form a clean tear in the lower layer upon the pulling action.

DETAILED DESCRIPTION

Figure 1:
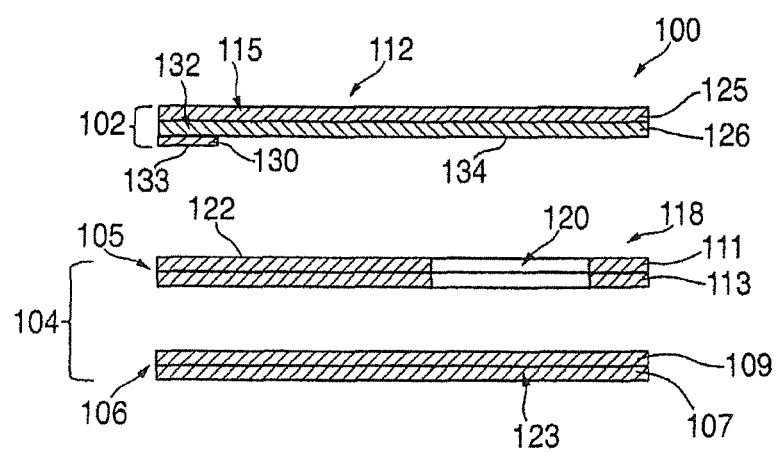
FIG. 1 is an exploded cross-sectional view of an exemplary pull-tab sealing member.

A sealing member or inner seal for a sealing to a rim of a container is described herein that is capable of initially providing sealing for the container to maintain product freshness and subsequently for providing a dispenser or dispensing feature having a cleanly formed opening or other passage therethrough for dispensing container contents. The sealing members or inner seals herein are constructed from flexible sheets or laminates defining one or more integrated or preformed dispensing feature(s) or element(s) for dispensing contents from the container. The one or more integrated dispensing feature(s) or element(s) are initially covered on both sides to be exposed for use upon removal of a portion of the sealing member.

It will be appreciated that the sealing members herein may contain any number of dispensing features or elements, such as a single pour spout or multiple openings spaced in a number of varying shapes, sizes, and/or configurations in the flexible sheet. The disclosure herein may refer to a dispensing feature, element, opening, spout, perforations, and the like and/or combinations thereof to suggest but a few types of dispensers. It will be appreciated that, unless otherwise noted, such use of these terms are generally interchangeable and, unless also otherwise noted, any reference to a dispensing feature may also be a reference to one such feature or a plurality of such features as may be required for a particular application. For simplicity, this disclosure also generally refers to a container or bottle, but the sealing members described herein may be applied to any type of container, bottle, package, or other apparatus having a rim surrounding an access opening to an internal cavity where the access opening may benefit from dispensing features.

In one aspect, the sealing member includes a flexible sheet having the dispensing feature preformed or pre-defined therein, a removable cover sheet or laminate on one side of the flexible sheet covering one side of the dispensing feature, and a lower seal liner on the other side of the flexible sheet covering the other side of the dispensing feature. A bottom surface of the lower seal liner is sealed or bonded to the rim of a container, such as by induction or conduction heating, to initially provide a seal or cover for the container. In use, the removable cover laminate can be peeled from the flexible sheet to pull or otherwise tear a portion of the lower seal liner through the dispensing feature to fully expose the dispensing feature for dispensing or pouring contents from the container. In one approach, the removable cover laminate may include a pull-tab member on an upper surface thereon. In another approach, the sealing member is uniquely constructed so that even with the sealing member being formed from flexible sheet materials (and in some cases even with an optional foamed polymer layer), the lower seal liner can be cleanly torn through the dispensing feature of the flexible sheet to form a uniform opening or passage generally without frayed or ragged edges and without tearing or deforming the dispensing feature or the sheet material surrounding the dispensing feature.

In some approaches, this clean tear of the lower seal liner forming the full dispensing feature is achieved by a select relationship of the thickness of the flexible sheet relative to a thickness or amount of a bonding layer used to secure the cover laminate to the lower seal liner through the dispensing feature. If the flexible sheet is too thick relative to the bonding layer, then an unclean tear is formed in the lower seal liner resulting in frayed or ragged edges upon exposure of the dispensing features. On the other hand, if the flexible sheet is too thin relative to the bonding layer, then the flexible sheet tends to tear or deform at an edge of the dispensing feature during exposure thereof.

In another aspect and as mentioned above, the sealing member may include a pull-tab portion where the removable cover laminate is configured to be separated from the container (and remaining portions of the sealing member bonded to the container) by using the pull-tab. The remaining layers under the removable cover laminate (except the portion of the lower seal layer removed with the cover laminate) remain adhered to the container. In some approaches, the pull-tab is defined wholly within a perimeter of the sealing member or a perimeter of the flexible sheet. In other approaches, the pull-tab extends from a periphery of the sealing member.

Turning FIGS. 1-5, a sealing member 100 is shown as a laminate formed from flexible sheet materials or flexible layers that include an upper peelable or removable cover laminate 102 bonded to a lower liner portion 104. The lower liner portion 104 includes a top flexible sheet 105 (having one or more die cut openings therein) and a lower seal liner 106. FIG. 1 is shown with some layers exploded apart for clarity, but it will be appreciated that the various layers of the sealing member 100 are bonded together as generally shown in the later figures.

Figure 2:
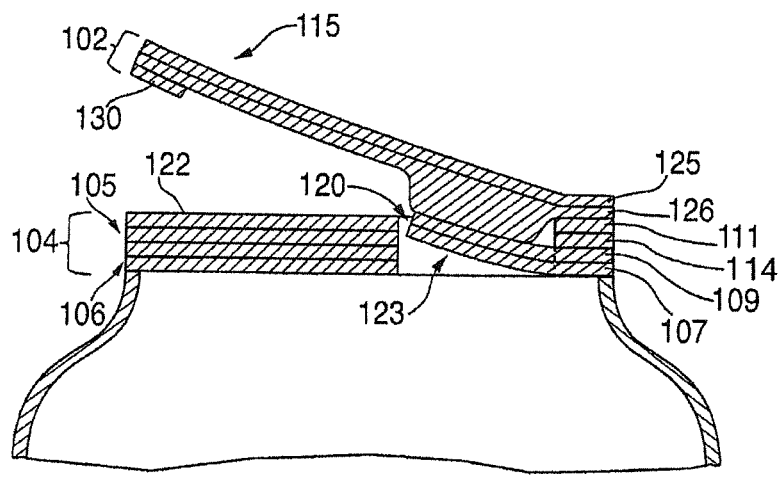
FIG. 2 is of a cross-sectional view of an exemplary pull-tab sealing member after the tab has been pulled.
Figure 4:
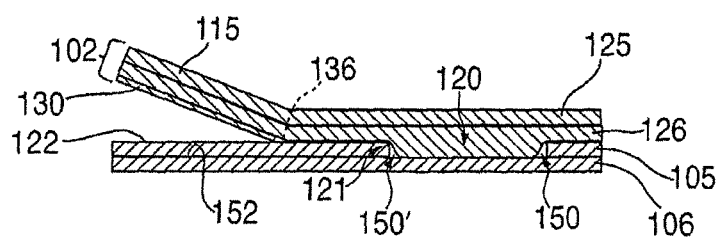
FIG. 4 is a cross-sectional view of an exemplary pull-tab sealing member.
Figure 5:
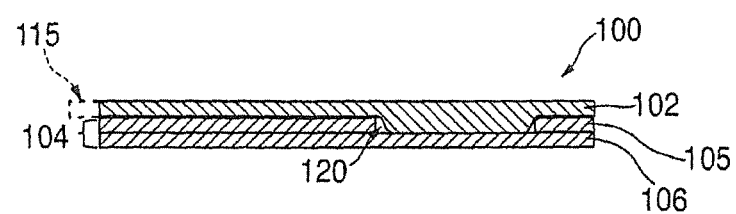
FIG. 5 is a cross-sectional view of an exemplary sealing member.

In one approach and as shown in the drawings, the upper removable cover laminate 102 may include a pull-tab structure 112, such as the pull or gripping tab 115 defined wholly within a perimeter or periphery 113 of the sealing member 100. Alternatively, FIG. 5 shows the sealing member with an alternative side tab (phantom lines) and without a pull tab. As best shown in FIGS. 2 and 4, the pull tab 115 may extend upwardly from an upper surface 122 of the lower liner portion 104 to be wholly defined within a circumference or periphery 113 of the sealing member 100. As such, the pull tab 115 may pivot or hinge upwardly to form a gripping surface. Other types of pull tabs may also be used, such as tabs structures 115 extending from the periphery of the sealing member 100 and the like as generally shown by the optional side tab 115 in FIG. 5.

In use, the removable cover laminate 102 is removed by a consumer, using the pull-tab if so constructed, so that the sealing member 100 separates or peels apart at a splitting or separation point 118 to expose the lower liner portion 104 that remains sealed or bonded to the container's rim. The lower liner portion 104, after cover laminate 102 removal, fully defines one or multiple dispensing features or elements 120 extending completely through the portion 104 for dispensing contents out of the container or bottle. As shown, the dispensing feature 120 may be a single opening or aperture. Other dispensing features or elements may also be used.

Figure 3:
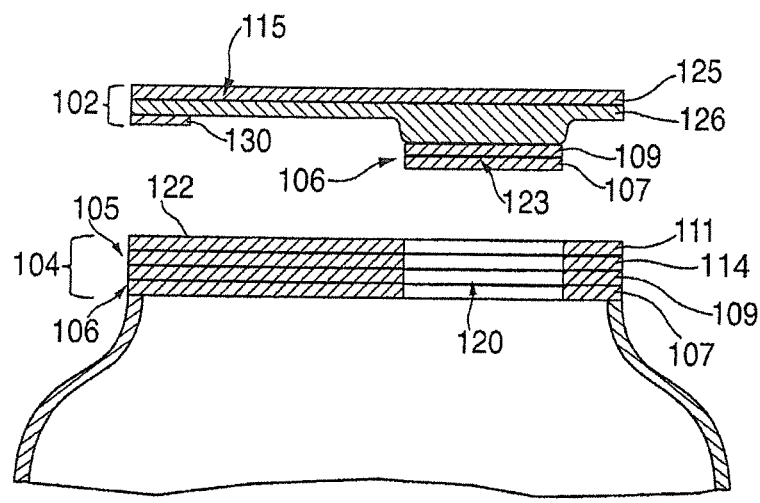
FIG. 3 is a cross-sectional view of an exemplary pull-tab sealing member after the tab is removed.

Prior to cover laminate 102 removal, the dispensing feature 120 may be defined only in and extend only through one or more layers of the flexible sheet 105 and not be defined in other layers of the lower liner portion 104. For instance, prior to cover laminate 102 removal, the lower liner portion 104 may also have portions or layers in the lower seal liner 106 that do not have a dispensing feature defined therein. As a result, only after removal of the cover laminate 102 is the dispensing feature exposed and/or is the full formation of the dispensing feature 120 complete by forming the dispensing feature in the other layers of the lower liner portion 104 as best shown in FIG. 3. Once the cover laminate 102 is removed by the consumer, the lower liner portion 104 is designed to remain bonded or adhered to the container's rim and across a mouth of the container or bottle to provide the dispensing functionality.

It will be appreciated that the sealing members described herein will function in both a one-piece or two-piece sealing member configuration. A one-piece sealing member generally includes just the sealing member bonded to a container rim. A cap or closure may be also used therewith. A two-piece sealing member includes the sealing member temporarily bonded to a liner. In this construction, the sealing member is bonded to a container's rim, and the liner is configured to separate from the sealing member during heating to be retained in a cap or other closure used on the container. In a two-piece construction, a wax layer, for example, may be used to temporarily bond the sealing member to a liner. Other types of releasable layers may also be used to provide a temporary bond between the seal and liner.

Turning to more of the details, each portion of the sealing member 100 may be a multi-layer laminate constructed from flexible sheet materials or layers laminated or bonded together. While not shown in the drawings, coated adhesive may be used to bond some of the layers together. The upper portion 102 may be a cover laminate releasably bonded to the lower liner portion 104 through a bonding layer or adhesive 126 configured so that the sealing member 100 splits at the separation portion 118 upon peeling the portions apart, such as pulling on the tab structure 115. Upon separation of the cover laminate 102 from the lower portion 104, the dispensing feature 120 is fully formed and exposed for dispensing. In use, the bond between portions 102 and 104 is less than a bond between the lower liner portion 104 and a container rim. By one approach, the bonding layer 126 may, in some cases, be provided by polyolefin polymers, acrylic adhesives, release layers, wax, and the like so long as the bond between layers 102 and 104 is less than the bond between layer 104 and the container rim. By another approach, the bonding layer 126 is a heat activated bonding layer, such as ethylene vinyl acetate (EVA) or the like. A release layer may be provided on the upper surface 122 of the lower liner portion as needed to achieve the desired bond between layers 102 and 104.

As suggested above, the upper portion 102 forms a removable cover laminate that is peeled or otherwise removed from the lower seal layers 104 to expose and complete the formation of the dispensing feature 120. One approach of the cover laminate 102 may include an upper support layer 125 over the bonding layer 126. This approach may be a coextruded two-layer film. In this exemplary approach, the upper support layer 125 may include a polymer support layer, such as polyester like polyethylene terephthalate (PET) with a heat activated bonding layer 126, such as ethylene vinyl acetate (EVA) or other polymer layer 126 underneath.

A lower surface of the pull tab portion 112 may also include a tab stock or other release layer 130 that is bonded to only a portion 132 of the bonding layer 126 (or cover laminate 102) to form the pull tab 115. A lower surface 133 of the tab stock 130 is configured to not bond or adhere to the lower liner portion 104. At the same time, a portion 134 of the bonding layer 126 is bonded to the lower liner portion 104 (see, e.g., FIG. 4). Thus, the tab stock or release layer 130 prevents a portion of the cover laminate 102 from being completely bonded to the lower liner portion 104 at surface 122. To this end and because of the tab stock or release layer 130, the lower surface 134 of the cover laminate 102 only bonds to the lower liner portion 104 up to a boundary line 136 (FIG. 4) so as to form the tab 115, which can pivot upwardly at the boundary 136 for grasping. Many types of pull tab portions may be used. The above described approach is but one example. Others approaches may be, or example, as described in U.S. Pat. Nos. 5,433,992; 5,514,442; 5,004,111; 6,866,926; 6,902,075; 7,217,454; US 2006/0151415; and US 2008/0233339. Each of these patents and publications are incorporated herein by reference in their entirety.

More specifically, the tab 115 of the tab structure 112 may be at least partially defined via the tab stock 130 that extends only part way across the surface of the seal 100. By one approach, the tab stock 130 is a partial layer that extends part-way across the length of the lower liner portion 104. Tab stock 130 forms the tab 115 because it bonds, in one approach, to the heat-activated bonding layer 126 and generally prevents layer 126 (and the layers above) from adhering to an upper surface 122 of the lower liner portion 104 across at least a portion thereof as generally shown in FIGS. 1 and 4. That is, a top surface of the tab stock 130 is adhered to a lower portion of the heat-activated bonding layer 126. A bottom surface of tab stock 130 is adjacent to, but not bonded to, the upper surface 122 of the lower liner portion 104 to form the tab 115. While the relative dimensions of the tab stock 130 are not particularly limited, in some cases the tab stock 130 lies wholly within a circumference or perimeter 113 of the seal 100 and/or lower liner portion 104 and, typically, the tab stock 130 occupies about 15 to about 50 percent of surface area of the sealing member 100. In one aspect, the tab stock 130 is formed of polyester, such as polyethylene terephthalate (PET), or paper. Other suitable materials for the tab stock include nylon and polypropylene. By one optional approach, a lower surface of the tab stock 130 may be coated with a release material, for example silicone. The optional release coating minimizes the possibility that the tab stock 130 will become adhered to the upper surface 122 of the lower liner portion 104 during a heat sealing or induction heat sealing process. However, such release coatings are not typically necessary.

In general, the various layers of the cover laminate 102 and the lower liner portion 104 (described below) may be formed by laminating and adhering their respective layers together with an adhesive. Suitable adhesives may include, but are not limited to, ethylene acrylic acid copolymers, curable two part urethane adhesives and epoxy adhesives. As used herein, the term adhesive will generally include curable adhesives, heat activated adhesives and thermoplastic adhesives.

The lower liner portion 104 may include a multi-layer sheet or laminate having the dispensing feature 120 defined at least partially therein prior to cover laminate removal. By one approach, the lower liner portion 104 may include an upper layer of the flexible sheet 105 and the lower seal liner 106. The seal liner 106 may include a hot melt adhesive or other heat seal layer 107 under an induction heating or membrane layer 109 for bonding or securing the lower liner portion 104 to a container rim by a heat seal, conduction sealing, or induction sealing. Suitable heat-activated adhesives or sealants include, but are not limited to, polyesters, polyolefins, ethylene vinyl acetate, ethylene-acrylic acid copolymers, surlyn and other suitable materials. By one approach, the heat seal layer 107 may be a single layer or a multi-layer structure of such materials about 0.2 to about 3 mils thick. By some approaches, the heat seal layer is selected to have a composition similar to and/or include the same polymer type as the composition of the container. For instance, if the container contains polyethylene, then the heat seal layer would also container polyethylene. If the container contains polypropylene, then the heat seal layer would container polypropylene. Other similar materials combinations are also possible. The lower seal liner 106 is initially provided to extend completely across the sealing member 100 with no dispensing feature 120 defined thereon. Thus, the sealing members herein are capable of providing good sealing capabilities because of the full coverage of the lower bonding layer 106 over any mouth or container opening. In some approaches, the lower seal liner 106 forms a full layer across sealing member and is free of and devoid of any perforations, weakened areas, or other split portions that would tend to reduce the sealing capability of the layer.

Above the heat seal layer 107 may be the induction heating or membrane layer 109. In one approach, this layer may be foil, aluminum, tin, other metalized polymers, non-metalized polymers, and the like as well as combinations thereof. These layers may be bonded together or bonded to the lower bonding layer 107 with any suitable adhesive, such as those described above. In other approaches, the membrane layer may be a polymer layer in combination with an induction heating layer. The membrane layer may also be or include an atmospheric barrier layer capable of retarding the migration of gases and moisture at least from outside to inside a sealed container and, in some cases, also provide induction heating at the same time. Thus, the membrane layer may be one or more layers configured to provide such functionalities. By one approach, the layer 109 is about 0.3 to about 2 mils of a metal foil, such as aluminum foil, which is capable of providing induction heating and to function as an atmospheric barrier. The induction heating or membrane layer 109 is also initially provided to extend completely across the sealing member 100 with no dispensing feature 120 defined thereon and, by some approaches, is free of and devoid of any perforations, weakened areas, or other split portions that would tend to reduce the sealing capability of this layer.

Above the lower seal liner 106 and, in particular, the induction heating or membrane layer 109 thereof is the flexible sheet 105, which is configured to provide support, structure, and tear resistance to the liner portion 104 and also initially define the dispensing feature 120 therein. The flexible sheet 105 may be formed from a heat resistant sheet-like material, which can maintain its strength at small thicknesses even with the dispensing features 120 extending therethrough. By one approach, the flexible sheet 105 may include an upper polymer support layer 111, such as a polymer selected from, but not limited to, EVA, PET, PEN, nylon, polyesters, polyethylene, polypropylene, ethylene-acrylic acid copolymers, ethylene methacrylate copolymers, blends thereof, or the like materials. By one approach, upper support layer 111 may be a PET layer having a release coating on an upper surface thereof. Prior to the separation of the cover laminate 102 from the lower liner portion 104, the flexible sheet 105 and the support layer 111 thereof define the dispensing feature 120 therein, such as a bore or through passage extending through this layer. The bore or passage may be a die cut hole or other opening extending only through the flexible sheet 105.

The flexible sheet 111 may also be combined with another layer capable of bonding the sheet 111 to the lower bonding layer 106. By one approach, the flexible sheet 111 may be bonded to a lower heat activated bonding layer 113 or a multi-layer composite including, for example, a PET and EVA layer. Other composite layers and co-extruded layers may also be used. Bonding layer 113 aids in bonding the flexible sheet to the lower seal liner 106. Prior to the separation of the cover laminate 102 from the lower liner portion 104, the layer 113 also includes the dispensing feature 120 defined therein, which may be the same die cut hole or other opening mentioned above.

In some approaches, the flexible sheet 105 may have a total density of about 0.6 to about 1.5 g/cc and, in other approaches, about 0.9 to about 1.4 g/cc. While not wishing to be limited by theory, it is believed that such density ranges may, in combination with the other features described herein, aid in forming a flexible sheet 105 that is capable of providing a cleanly torn or formed dispensing apparatus by the tearing or pulling of portions of the lower seal liner 106 through the dispensing apparatus 120. As discussed further below, a total thickness of the flexible sheet 105 may also be selected relative to the bonding layer 126 to achieve the cleanly torn and formed dispensing apparatus 120. In some approaches, the flexible sheet 105 has a thickness from about 0.5 to about 2 mils and is generally included in the sealing member laminate in a specific relationship with the amount or thickness of the bonding layer 126 in order to effectively form the dispensing feature 120 upon removal.

By another approach, the flexible sheet 105 may also include a foamed layer, such as a foamed polymer. If used, the foamed polymer may include, but not be limited to, polyolefin foams, polyester foams, co-polymer foams, and the like. The foamed polymer may have a density from about 0.4 to about 0.9 g/cc and, in other approaches, about 0.6 to about 0.9 g/cc. In some approaches, if a foamed polymer layer is used within the flexible sheet 105, this foamed layer may also be a blend of a higher density polymer and a lower density polymer in order to increase its internal strength. In some approaches, this foamed layer may include about 50 to about 70 percent high density polymer (such as high density polyethylene, and the like) and about 30 to about 50 percent of a low density polymer (such as a low density polyethylene and the like). If used, the foam layer may be about 0.5 to about 1.5 mils thick.

When assembled, the bonding layer 126 adheres the upper support layer 125 to the flexible sheet 105 and also to the lower seal liner 106 because the bonding layer 126 extends through the dispensing feature 120. Thus, upon pulling of the pull tab 115, the entire cover laminate 102 is removed from the lower liner portion 104 at separation point 118, which may be due to the release layer or coating on the upper surface 122 of the lower portion 104. Upon this pulling, the bond between the layer 125 and layer 106 via the bonding layer 126 is strong enough to pull a portion 123 of the lower seal liner 106 through the dispensing feature 120. To this end, this pulling tears or ruptures the portion 123 of the lower seal liner 106 (i.e., the induction heating or membrane layer 109 and the heat seal layer 107 thereof) adjacent to or under the dispensing feature 120 about its edge thereof. Thus, removal of the upper cover laminate 102 also removes a portion of the membrane layer 109 and a portion of the heat seal layer 107 that correspond to or are superimposed under the dispensing feature 120 defined in the flexible sheet 105. This then forms a complete dispensing feature 120 extending through the entire lower liner portion 104. Upon cover laminate 102 removal, a consumer can then dispense a product from a container through this dispensing feature 120. In some approaches, after cleanly removal of the lower seal liner portion 123 through the dispensing feature 120 to fully form the dispensing feature 120 through the entire lower liner portion 104, the lower seal liner 106 forms a very small flange or lip extending into the dispensing feature. In some approaches, that flange of lip may be about 2 mm or less, in some approaches, about 1 mm or less, and in other approaches, about 0.5 mm or less, and in yet other approaches, no flange or lip is formed.

To form a clean tear or rupture of the membrane and bonding layers 109 and 107, in some cases, the sealing members herein include a specific relationship or ratio of the thickness of the bonding layer 126 to a thickness of the flexible sheet 105. By one approach, this relationship or ratio may be about 1:1 to about 1:0.25. This may be referred to as an inner seal bonding ratio. In other words, the thickness of the flexible sheet 105 ranges from being about the same as to about 25 percent of the thickness of the bonding layer 126.

In some approaches, the flexible sheet 105 may be a relatively thin layer of about 0.5 to about 2 mils thick, and in other approaches, about 1 to about 1.5 mils thick. The bonding layer 126 may be about 0.5 to about 2 mils thick, and in other approaches, about 1 to about 2 mils thick. While not wishing to be limited by theory, these thicknesses and ratios thereof mentioned above are effective to allow the bonding layer 126 to form a bond to the membrane layer 109 through the dispensing feature 120 and form that bond substantially completely across its entire surface underneath or corresponding to the area of the dispensing feature 120. These thicknesses and relationships minimize any gaps 150 at the interface of a lower periphery of the dispensing feature 120 and the upper surface 152 of the lower seal liner 105. These minimized gaps 150 are best shown in FIGS. 4.

A thicker flexible layer relative to the amount of a bonding layer, such as a flexible layer 105 of about 4.5 mils with a bonding layer of about 2 mils (i.e., a bonding ratio of about 1:1.8) causes a much larger gap at the peripheral interface of the dispensing feature 120 such that a rough or frayed edges are formed upon tearing. A relatively thin flexible layer of about 0.5 mils to about 2 mils relative to the bonding layer ratios mentioned above minimizes the gap 150 effective to permit a clean tear of lower seal liner 106 through the flexible sheet 105 substantially free of any frayed or ragged edges.

If the flexible sheet 105 is too thin relative to the bonding layer 126, such as below about 0.5 mils, the sheet 105 generally does not have sufficient internal strength when formed of the polymers and materials described herein to withstand the lower seal liner 106 being pulled through the dispensing feature 120. When the sheet 105 is below about 0.5 mils, the dispensing feature tends to tear or elongate into a teardrop shape when the lower bonding layer 106 is pulled therethrough upon removal of the cover laminate.

In some approaches, the sealing member 100 may have a non-uniform gap 150 within the dispensing apparatus 120 between the bonding layer 126 and edge of the dispensing feature. To this end, one side of the dispensing feature 150', such as the side closest to the tab structure 112, may have a smaller gap than the gap on the opposite side of the dispensing feature 150 as generally shown in FIG. 4. This leading edge 121 of the dispensing feature 120 with the smaller gap 150' (i.e., a leading edge gap) may, in some cases, be effective to initiate tearing of the lower seal liner 106 cleanly. Once the clean tear is started near the leading edge of the dispensing feature 120, then the tear will propagate about the dispensing feature 120 edge cleanly.

The lower liner portion 104 includes the one or more dispensing features 120 at least partially defined in the support layer 111 and bonding layer 113 prior to cover laminate 102 removal and, thereafter (such as after cover removal) has the full dispensing feature 120 defined in all layers below the cover laminate 102 (that is, all layers of the flexible sheet 105 and bonding layer 106) after cover laminate removal. The exemplary dispensing feature 120 is shown as round in the figures, but other sizes, shapes, amounts, and configurations may also be used as needed for a particular application.

The various layers of the sealing member may be assembled via a heat lamination process forming a sheet of the described layers. Adhesive coating and/or extrusion lamination may also be used. The resulting laminate sheet of the sealing members herein can be cut into appropriate sized disks or other shapes as needed to form a vessel closing assembly or tabbed sealing member. The cut sealing member is inserted into a cap or other closure which, in turn, is applied to the neck of a container to be sealed. The screw cap can be screwed on to the open neck of the container, thus sandwiching the sealing member between the open neck of the container and the top of the cap. Heat or induction current or other sealing is then applied to seal the bottom subassembly of layers forming the seal portion to the neck of the container.

It will be understood that various changes in the details, materials, and arrangements of the seal laminate and methods of making thereof, which have been herein described and illustrated in order to explain the nature of the seals described herein, may be made by those skilled in the art within the principle and scope of the embodied description and claims. Unless otherwise stated herein, all parts and percentages are by weight.

What is claimed is:

1. A sealing member for sealing to the rim of a container and for providing a dispensing opening, the sealing member comprising:
    a flexible sheet of one or more layers having an inner edge defining at least one preformed dispensing opening extending therethrough, the flexible sheet having an upper surface and a lower surface thereof;
    a cover laminate removably adhered to the upper surface of the flexible sheet, the cover laminate including a polymer support layer and a bonding layer,
    a pull tab of the cover laminate, the pull tab defined wholly within a perimeter of the sealing member;
    a seal liner adhered to the lower surface of the flexible sheet, the seal liner including a foil layer;
    the bonding layer of the cover laminate extending through the at least one preformed dispensing opening to bond the polymer support layer of the cover laminate to the seal liner; and
    upon pulling of the pull tab to separate the cover laminate from the flexible sheet, the seal liner including the foil layer tears through the preformed dispensing opening at the inner edge thereof such that a portion of the seal liner under the pre-formed dispensing opening is removed with the cover laminate.

2. A sealing member of claim 1, wherein a thickness of the flexible sheet is between about 0.5 and about 2 mils and a thickness of the bonding layer is about 0.5 to about 2 mils.

3. The sealing member of claim 1, wherein the flexible sheet includes a foamed polymer layer.

4. The sealing member of claim 1, wherein the flexible sheet is a laminate having a foamed polymer layer and a second polymer layer adhered to the foamed polymer layer.

5. The sealing member of claim 1, wherein the upper surface of the flexible sheet has a release coating thereon.

6. The sealing member of claim 1, wherein the one or more layers of the flexible sheet have a total density of about 0.6 to about 1.5 g/cc.

7. The sealing member of claim 1, wherein a ratio of a thickness of the bonding layer to a thickness of the flexible sheet is from about 1:1 to about 1:0.25.

* * * * *